(No Model.)  2 Sheets—Sheet 1.

A. SEIBERT.
MACHINE FOR DELINTING COTTON SEED.

No. 383,374.  Patented May 22, 1888.

WITNESSES:
Chas. J. H. Amon
Paschal J. Ferrara

INVENTOR:
Antony Seibert,
By his Attorneys,
Arthur E. Fraser & Co.

(No Model.) 2 Sheets—Sheet 2.
A. SEIBERT.
MACHINE FOR DELINTING COTTON SEED.
No. 383,374. Patented May 22, 1888.
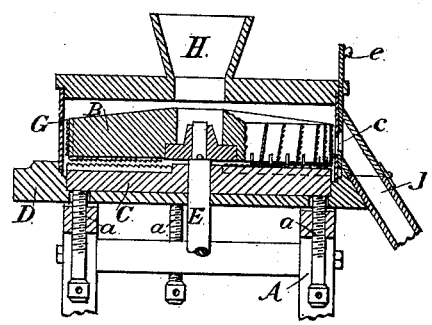
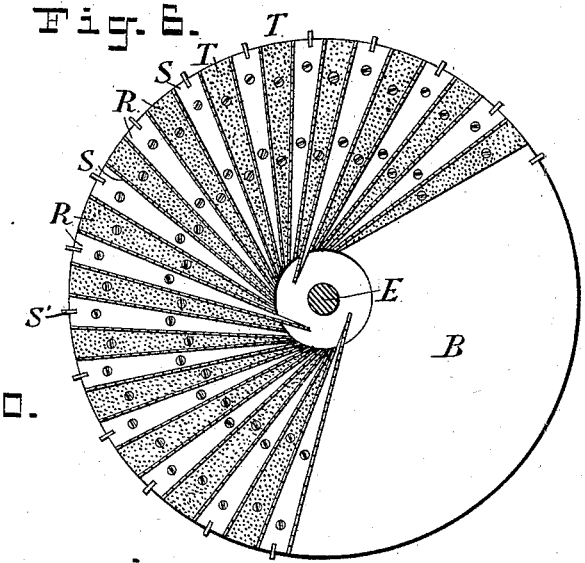
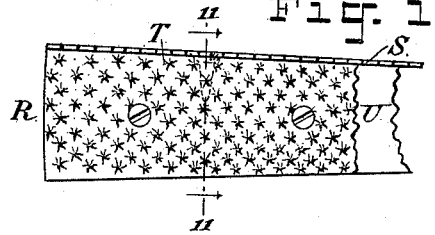
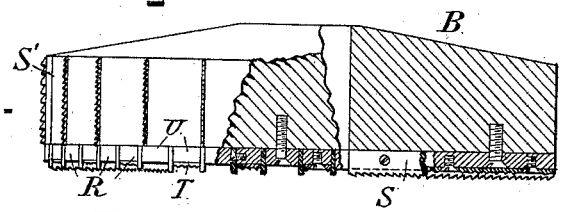
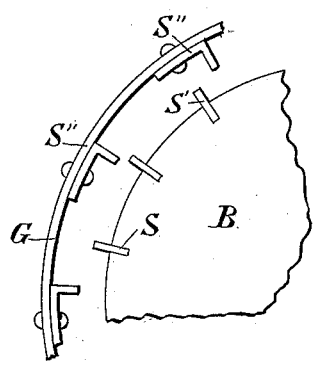
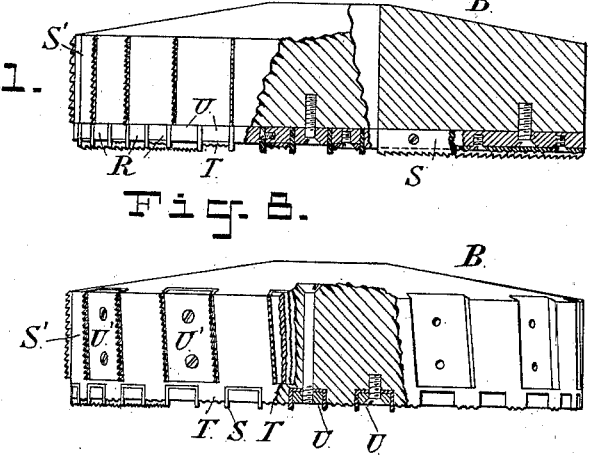
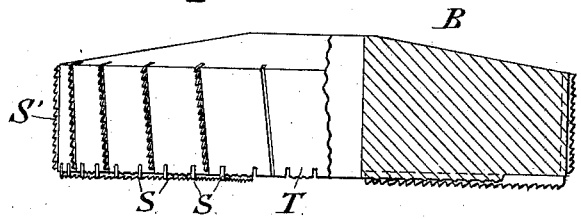
WITNESSES:
C. J. H. Amon.
Paschal J. Ferrara
INVENTOR:
Antony Seibert,
By his Attorneys,
Arthur C. Draper & Co.

UNITED STATES PATENT OFFICE.

ANTONY SEIBERT, OF ROCK RIFT, NEW YORK.

MACHINE FOR DELINTING COTTON-SEED.

SPECIFICATION forming part of Letters Patent No. 383,374, dated May 22, 1888.

Application filed March 26, 1887. Serial No. 232,477. (No model.)

*To all whom it may concern:*

Be it known that I, ANTONY SEIBERT, a citizen of the United States, residing at Rock Rift, Delaware county, in the State of New York, have invented certain new and useful Improvements in Cotton Seed Cleaners, of which the following is a specification.

This invention relates to machines for cleaning cotton seed and removing the hull therefrom, its object being to effectually separate from the seed the adherent cotton fiber and the hull and to deliver the seed in a condition suitable for grinding, in order that it may be utilized for the extraction of cotton seed oil or for other purposes.

In the cleaning of cotton-seed the difficulty usually experienced is that the cotton is liable to roll into balls, which seriously obstructs the action of the grating or polishing devices which remove it from the surface of the seed. In my improved machine I have obviated this difficulty by providing teeth of the character of saw-teeth, which keep the cotton fiber opened or combed out and leave the seeds exposed to the action of the grating or rubbing surfaces.

My improved machine is constructed with grating or grinding devices analogous to the millstones used in a flouring-mill. One of the grinding disks or "stones" is stationary and the other revolves, or both may revolve, either in different directions or in the same direction at different speeds. Their active faces are armed with radial or tangential toothed plates or saws or rows of teeth with intervening flat "lands," the latter being formed or provided with roughnesses or grating or scouring surfaces, being preferably alternately smooth and roughened. The cotton and hulls are torn and rubbed off from the seeds during the passage of the latter between the grinding-disks, and all pass out together from the cylinder or chamber inclosing these disks, and are conducted to a separator, which removes the lighter impurities and directs the seeds and the hulls and fiber into distinct receptacles.

Having thus described my invention in general, I will now proceed to describe in detail the particular construction which I prefer for carrying it into practice.

Figure 1:
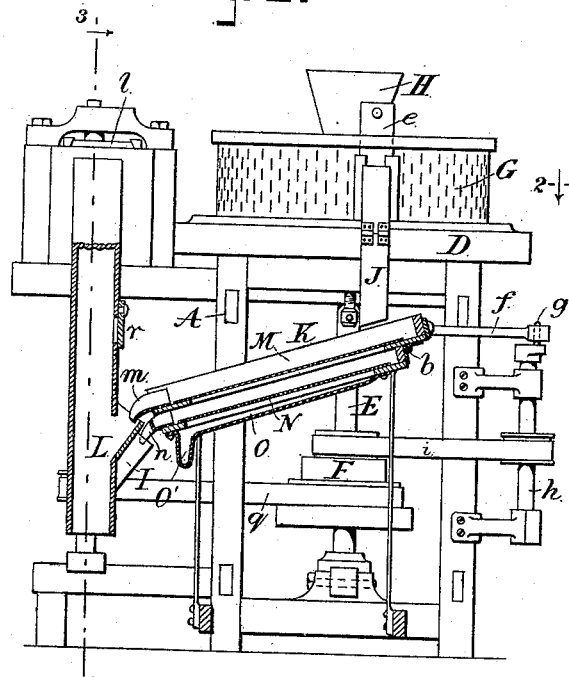
Figure 3:
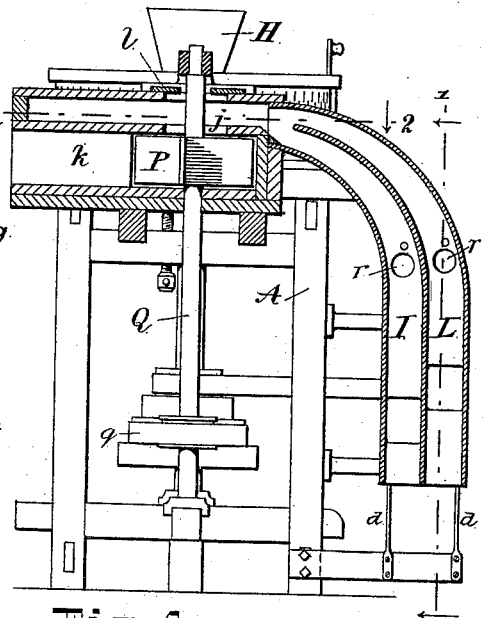
Figure 2:
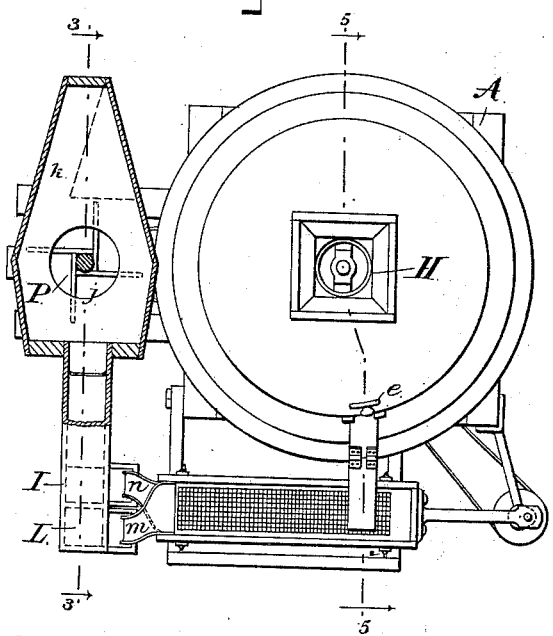
Figure 4:
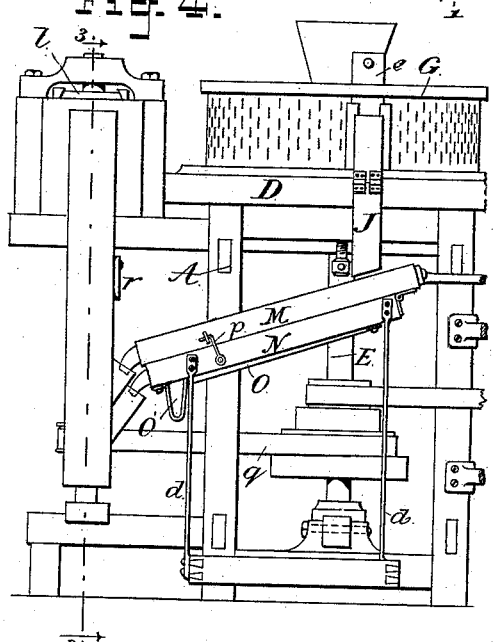

Figure 1 of the accompanying drawings is a front elevation of my improved machine, partly in vertical section, cut on the line 1 1 in Fig. 3. Fig. 2 is a plan thereof, partly in horizontal section, on the line 2 2 in Fig. 3. Fig. 3 is a side elevation, partly in vertical section, on the lines 3 3 in Figs. 1 and 2. Fig. 4 is a front elevation partly broken away. Fig. 5 is a fragmentary vertical section cut on the line 5 5 in Fig. 2. Fig. 6 is a plan or face view, on a larger scale, of one of the grinding disks or stones, part of the face being left blank. Fig. 7 is a side elevation thereof, partly in vertical section. Figs. 8 and 9 are elevations similar to Fig. 7 and showing modified constructions. Fig. 10 is a plan, on a still larger scale, of part of one of the grinding or rasping sections detached. Fig. 11 is a transverse section thereof, and Fig. 12 is a fragmentary horizontal view showing a modification.

Referring to the drawings, let A designate in general the frame of the machine, and B and C the respective grinding disks or stones. Of these B is the upper stone or runner and C the lower or nether stone, which is stationary, being mounted on a table, D, and adjusted by screws $a$ $a$. The runner B is mounted rigidly on the upper end of a vertical shaft, E, the lower end of which is stepped in a suitable bearing and provided with any known means of adjusting it vertically, in order to vary the distance apart of the respective grinding disks or stones. On the shaft E is fixed a cone-pulley, F, by means of which it may be driven through a belt in the usual way.

The grinding disks or stones B and C are inclosed in a cylindrical casing or chamber, G, which has a hopper, H, opening over its center for discharging the seed to be cleaned into the central opening of the upper stone, B. At one side of the casing G is an outlet-opening, $c$, which is partly covered by a vertically-adjustable slide, $e$, the adjustment of which not only opens or closes the opening $c$, but also necessitates the climbing of the seed to a higher or lower point up the side of the runner before it can escape. A spout, J, leads from this opening downwardly to the separator K.

The separator consists of two inclined vibrating sieves, M and N. The upper sieve, M, is the coarser of the two. The two sieves are hinged together by a hinge, $b$, at one end and are inclined thence downwardly at a steep incline to their opposite end, as shown in Fig. 1.

They are mounted on the upper end of four flexible rods, d d, the lower ends of which are fastened to the fixed frame of the machine, and they are connected by a pitman or rod, f, with a crank, g, on a shaft, h, which is driven by a belt, i, from the main shaft E. Thus the separator is rapidly vibrated or agitated during the operation of the machine. The hinging together of the two sieve-boxes at b is for the purpose of enabling the upper sieve to be turned up at will in order to gain access to the lower one.

I and L are two vertical air-conduits or suction-pipes, which are preferably constructed as subdivisions of a single air-trunk. These conduits or this air-trunk lead to a suction-fan, P, the casing of which they enter at j, and the outlet from which is at k, by a tangential passage. (Shown best in dotted lines in Fig. 2.) The blast is adjustable by a slide, l, at the top, by opening which the air-current in the suction-pipes I and L may be reduced. The fan P is fixed on a vertical shaft, Q, which is driven by a belt, q, from the main shaft E.

The lower end of the sieve-box M terminates in a curved spout, m, which projects over the lateral branch or opening into the suction-pipe L. The lower sieve-box, N, terminates likewise in a spout, n, which communicates in the same manner with the air-conduit I. Beneath the lower sieve, N, is a catch-plate or closed bottom O, which is inclined downward and terminates in a spout, O', which opens laterally. The boxes M N are held together by a hook, p, (shown in Fig. 4,) or by other suitable fastening. The air-conduits I and L are provided with dampers r r, by opening which air may be admitted to weaken the suction-current.

The construction of the grinding disks or stones is best shown in Figs. 6 and 7. These figures show an upper stone or runner, but the construction of the lower stone does not differ materially from that of the upper one. Both the upper and lower disks or stones are provided with radial or tangential teeth or serrations on their flat faces. In addition the upper stone has, by preference, rows of teeth extending across its periphery either vertically or at a slight angle. These peripheral teeth are omitted from the lower stone.

Fig. 6 shows the preferred arrangement of the teeth or serrated blades. These are lettered S S. I prefer to employ steel plates or blades the edges of which are cut with angular teeth similar to saw-teeth. The blades are let into the surface of the disk, so that only the teeth project beyond the edge thereof. It is preferable to make the toothed blades alternately with fine and coarse teeth. The spaces or lands R R between the serrated plates are, by preference, alternately smooth and rough. The smooth lands may present a smooth or very slightly roughened surface of metal or other material. The roughened lands (lettered T T) should present a coarse grating-surface, presenting jagged roughnesses adapted to scour the adherent cotton fiber from the surfaces of the seed. This grating-surface is made, by preference, from a plate or sheet of metal by punching holes through it from one side, in the same manner as a nutmeg-grater. Figs. 10 and 11 show one of the grater-sections.

U is a tapered section, of metal, hard wood, or other suitable material, which is screwed to the face of the stone. To its side is fastened one of the serrated blades S, with its teeth projecting above the face of the section. To the face of the section is fastened the grater-plate T, with its jagged protuberances projecting outwardly. In the construction shown in Fig. 7 there are as many sections U U as there are serrated plates S S, the graters T T being fastened only to every alternate section and the intermediate ones constituting the plain-surfaced lands. In lieu of this, however, the alternate surfaces might be formed on the stone itself in the manner shown in Fig. 8, where only the alternate lands are made in removable sections U U. In this latter case the serrated plates are made U-shaped in cross-section and pointed or wedge-shaped in plan, so that one section U fits within each bent plate and serves thus to secure it in position. Two methods of securing the sections U U to the stone are shown in Fig. 8, the screw in the one case being passed through the section and engaging the stone and in the other case being passed through the stone and engaging the section. In the construction shown in Fig. 9 there are no removable sections at all, but the blades S S are sunk in grooves in the face of the stone and the alternate intervening lands are dressed with the requisite roughened surfaces.

The serrated blades should be applied also to the periphery of the stone, as shown at S' in the drawings. They may extend vertically, as shown in Fig. 7, or at an angle, as shown in Figs. 8 and 9. They may be applied in various ways, either by being let into grooves, as shown in Figs. 7 and 9, or by being made of U shape and fastened by plates U', as shown in Fig. 8, or in any other convenient manner.

I prefer to construct the working-face of the stone of removable sections U U, for the reason that thereby any section can be removed and replaced in case of wear or breakage.

It must not be understood from my use of the word "stone" to indicate the grinding-disks that stone is the material of which these will necessarily be made. While they may be made of that material, I nevertheless prefer to make them of iron or wood. Iron is preferable, although hard wood answers the purpose well. They may, however, be made of any material that is suited to the purpose. The serrated plates or blades may be arranged in various ways, either tangentially, radially, or in curves, and may be continuous, segmental, or branched, according to any of the customary arrangements employed for the "dress" of millstones.

In operation the upper grinding disk or stone, B, is adjusted just high enough that its teeth shall clear the teeth on the lower disk, C, in order that the seeds shall not be cut up by shearing between the respective teeth. The upper disk or stone being in rapid revolution, the seeds, with their adherent fiber, are fed in at the hopper H and fall through the upper stone, passing thence outwardly in a radial direction between the two disks. During their passage the fibers are caught by the teeth, are pulled from the seeds, and are kept drawn or combed out in a thin web, somewhat as in a carding-machine, so that they cannot roll into balls and choke or otherwise obstruct the action of the apparatus. Simultaneously the hulls are rasped off from the seeds and the hulls are rubbed and cleaned of adhering fiber. These operations are due in part to the grating-surfaces T T, and probably in some degree also to the attrition of the seeds upon one another.

Upon the arrival of the seeds, hulls, and separated fibers at the periphery of the disks or stones they are caused to travel up along the periphery of the upper stone in the annular space between it and the casing G. The height to which they shall thus travel is determined by the adjustment up or down of the slide or gate e. In thus moving over the periphery they are acted upon by the peripheral toothed blades S' S', which keep the fibers drawn out and continue the scouring action upon the seeds until the latter pass out at the opening c. To facilitate the drawing action of the peripheral teeth, similar blades may be placed on the inside of the casing G, as is shown in Fig. 12, where these plates are lettered S" S"; or the casing G may be made of thin metal plate and be punched with vertical slits the edges of which project inwardly, as indicated in Figs. 1 and 4, which will have much the same effect, and will have the further advantage of permitting the escape through them of a portion of the dust that is separated by the action of the stones. The separated seeds, hulls, and fiber pass down the chute J and fall into the separator K, which is being violently agitated. In running down over the coarser sieve the seeds and loose dirt fall through this sieve, while the coarser hulls and the fiber pass down and are directed by the spout m into the air-conduit L, through which they fall into a bag or other receptacle. (Not shown.) The upward current of air through this conduit separates and carries with it the dust, lint, and in general all the lighter impurities, leaving the fiber and hulls in good condition for separation from each other by other mechanism. The seeds which fall through the coarse sieve run down over the finer sieve N, and are directed by the spout n into the conduit I, through which they fall into a bag or other receptacle. (Not shown.) The upward current of air in this conduit carries away all dust, lint, particles of fiber, hulls, and other light impurities which may have entered the conduit with the seeds, thus leaving the latter clean and thoroughly separated from foreign matters, so that they are in good condition for grinding or for utilization in other ways. The fine dirt that falls through the sieve M with the seeds is sifted out by the sieve N, through which it falls onto the plate O, which conducts it downward to the spout O', whence it falls into any suitable receptacle. (Not shown.)

In its general appearance and in much of its mechanism my present machine closely resembles a "grain-scourer" of my invention, patented October 11, 1881, No. 248,060. I make no claim herein to anything shown in that patent.

My machine may by a vertical adjustment of the upper disk, B, be so regulated as to either clean all the hull from the seeds or to leave fully two-thirds of it upon them. The former is preferable when the seeds are to be ground up or otherwise utilized immediately; but when they are to be shipped to a considerable distance, or are to be stored for a considerable time, it is preferable to leave a portion of the hull on them in order to prevent the drying out of the oil.

It will be understood that my invention is not limited to the construction of the projecting teeth by means of serrated plates or blades, although this is the most economical and convenient method of their construction. Each tooth might be formed separately on a rod or shank, and the rods or shanks might be set in suitable sockets in the grinding-disks, either in continuous rows or at intervals, distributed over the surface of the disks.

Wherever in this specification and claims I have referred to the serrated blades as being "radial," it will be understood that I use this term in the broad sense of extending outwardly from the center, either in exactly radial direction, or more or less divergent therefrom or tangential. It is desirable to have the blades cross the rotative path of the stones.

I am well aware that grain-hullers have been made wherein the stones have points or teeth set close together and at a uniform level, so as to constitute a rasping or grinding surface. My invention requires that the stones shall have teeth projecting beyond the general level of their rasping or grinding surfaces and out of contact with one another, so that they will act to comb out the fiber without cutting up the seeds.

What I claim, and desire to secure by Letters Patent is, in a machine for cleaning cotton-seed, or for separating fiber therefrom, or for other analogous uses, the following defined novel features and combinations, substantially as hereinbefore specified, namely:

1. The combination, with a casing, of two grinding-disks therein mounted to rotate relatively to one another, formed with grinding or rasping surfaces, and provided with teeth projecting beyond said grinding or rasping surfaces, and the disks spaced apart, so that the teeth on the opposite disks are out of contact with one another, whereby the teeth are adapted to tear the fiber from the seeds, keep it combed out and prevent its balling.

2. The combination, with a casing, of two grinding-disks therein mounted to rotate relatively to one another, formed with reciprocal grinding or rasping surfaces and provided with radial serrated blades set with their teeth projecting beyond said grinding or rasping surfaces, whereby the teeth are adapted to tear the fiber from the seeds, keep it combed out and prevent its balling.

3. The combination of two grinding disks, the lower one stationary and the upper one rotary, mechanism for rotating the upper disk, a casing inclosing the latter, projecting teeth set in the working-faces of the respective disks, projecting teeth set in the periphery of the upper disk, and projections from the inner face of the casing adapted to coact with the said peripheral teeth to keep the fiber drawn out and prevent its balling.

4. The combination, with two grinding-disks rotating relatively to one another, of radial serrated blades attached to the respective disks, with their teeth projecting from the working-faces thereof, and removable sections or lands attached to the disks between the blades.

5. The combination, with two grinding-disks rotating relatively to one another, of radial serrated blades attached to the respective disks, with their teeth projecting from the working-faces thereof, and with grating-surfaces applied at intervals between said blades.

6. The combination of two grinding-disks rotating relatively to one another, with serrated blades attached to the respective disks, with their teeth projecting from the working-faces thereof, and with said working-faces composed of alternately-arranged plain lands and graters.

7. The combination of two grinding-disks rotating relatively to one another, with removable sections attached to the working-faces thereof, with serrated blades fastened to said sections and removable therewith, and with graters applied to certain of said sections.

In witness whereof I have hereunto signed my name in the presence of two subscribing witnesses.

ANTONY SEIBERT.

Witnesses:
ARTHUR C. FRASER,
GEORGE H. FRASER.